United States Patent [19]

Honda

[11] 4,350,126
[45] Sep. 21, 1982

[54] INTERNAL COMBUSTION ENGINE

[75] Inventor: Shoichi Honda, Tokyo, Japan

[73] Assignee: Honda Giken Kogyo Kabushiki Kaisha, Tokyo, Japan

[21] Appl. No.: 180,957

[22] Filed: Aug. 25, 1980

[30] Foreign Application Priority Data

Sep. 4, 1979 [JP] Japan .................................. 54-113315

[51] Int. Cl.³ ............................. F02F 1/42; F02F 3/28
[52] U.S. Cl. ...................................... 123/315; 92/177;
 123/193 P; 123/193 H; 123/432
[58] Field of Search ................... 123/315, 308, 193 H,
 123/193 P, 432; 92/177

[56] References Cited

U.S. PATENT DOCUMENTS 3,903,849 9/1975 List et al. .............................. 123/308
4,256,068 3/1981 Irimajiri et al. ...................... 123/432

FOREIGN PATENT DOCUMENTS 687528 2/1953 United Kingdom ................ 123/315
1256401 12/1971 United Kingdom ................ 123/432

Primary Examiner—Craig R. Feinberg
Attorney, Agent, or Firm—Lyon & Lyon

[57] ABSTRACT

An internal combustion engine has an oblong piston sliding in an oblong cylinder bore, with the major dimension at right angles to the crank shaft axis. A set of intake valves communicates with the oblong combustion chamber near one end thereof, and a set of exhaust valves communicates with the combustion chamber near the other end thereof. Each of the intake and exhaust valves are of the poppet type and each has a longitudinal axis inclined with respect to the cylinder bore axis, the axes of two intake valves and two exhaust valves lying in the same plane and intersecting at a common point. The angular spacing between said two intake valves and said two exhaust valves are substantially the same.

7 Claims, 9 Drawing Figures

INTERNAL COMBUSTION ENGINE

This invention relates to four cycle internal combustion engines having one or more oblong pistons each slidably received in an oblong cylinder bore.

The term "oblong" refers to a cross-section which is "oval" or "elliptical" or elongated circular shape with straight sides and semi-circular ends, or to any cross-section in which the length and breadth are not equal.

An important object of this invention is to provide each combustion chamber with intake ports and exhaust ports all having very high total cross-sectional area, without increasing the length of the engine. Each port is closed by the head of a poppet-type valve. To achieve this object, the combustion chamber for each cylinder bore and piston is formed oblong in shape with the major dimension extending at right angles to the axis of the crank shaft. For efficiency each combustion chamber has an arched roof, and the axes of the intake and exhaust poppet-type valves are inclined so that the valve heads cooperate with combustion chamber walls to form the arched roof of each combustion chamber. A spark plug is provided for each combustion chamber, and is positioned substantially on the transverse axis thereof.

Other objects and advantages will appear hereinafter.

In the drawings:

FIG. 8 is a sectional view similar to FIG. 2, and FIG. 9 is a sectional view taken along the lines 9—9 as shown on FIG. 8.

Figure 2:
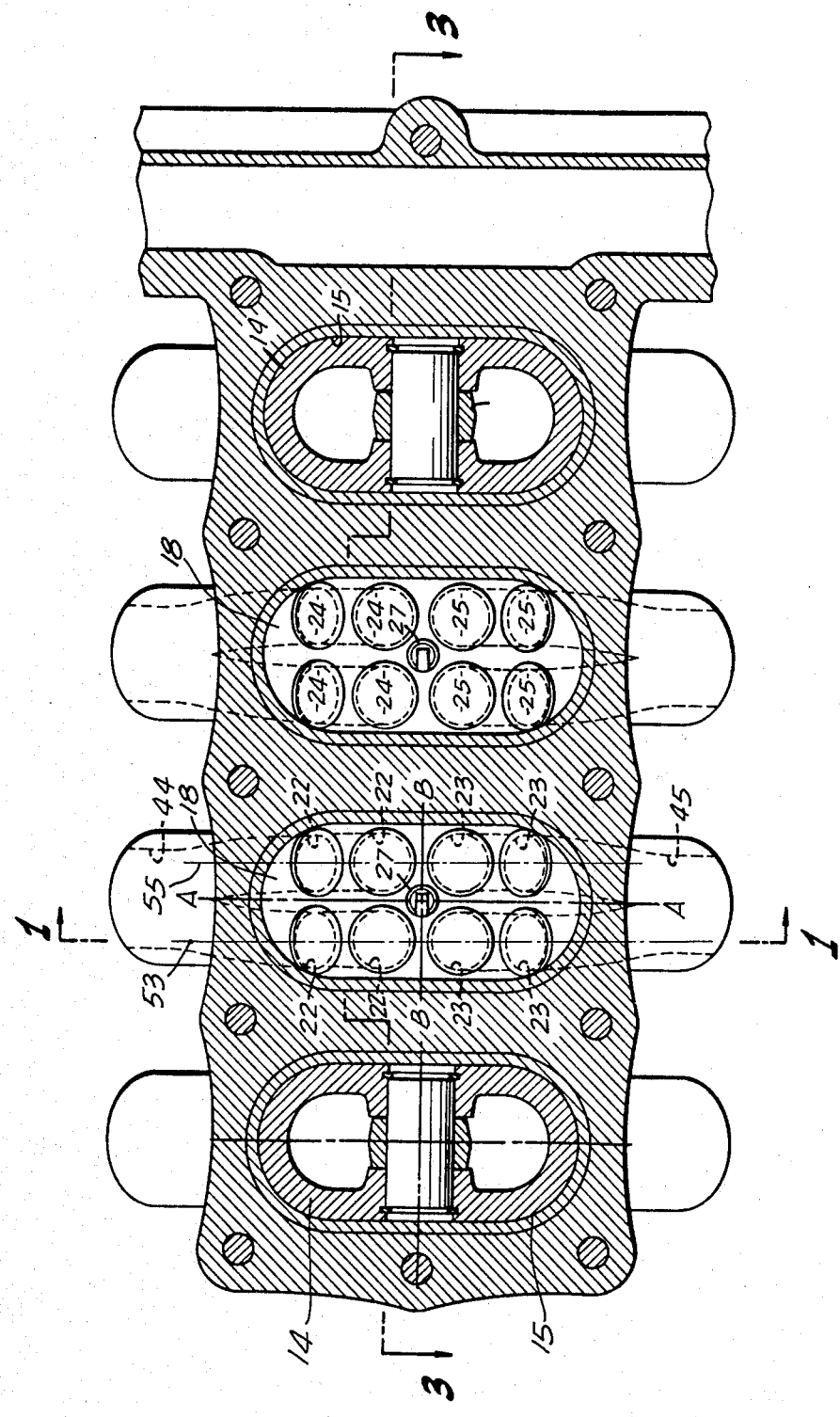
FIG. 2 is a sectional view taken substantially on the lines 2—2 as shown on FIG. 3.
Figure 3:
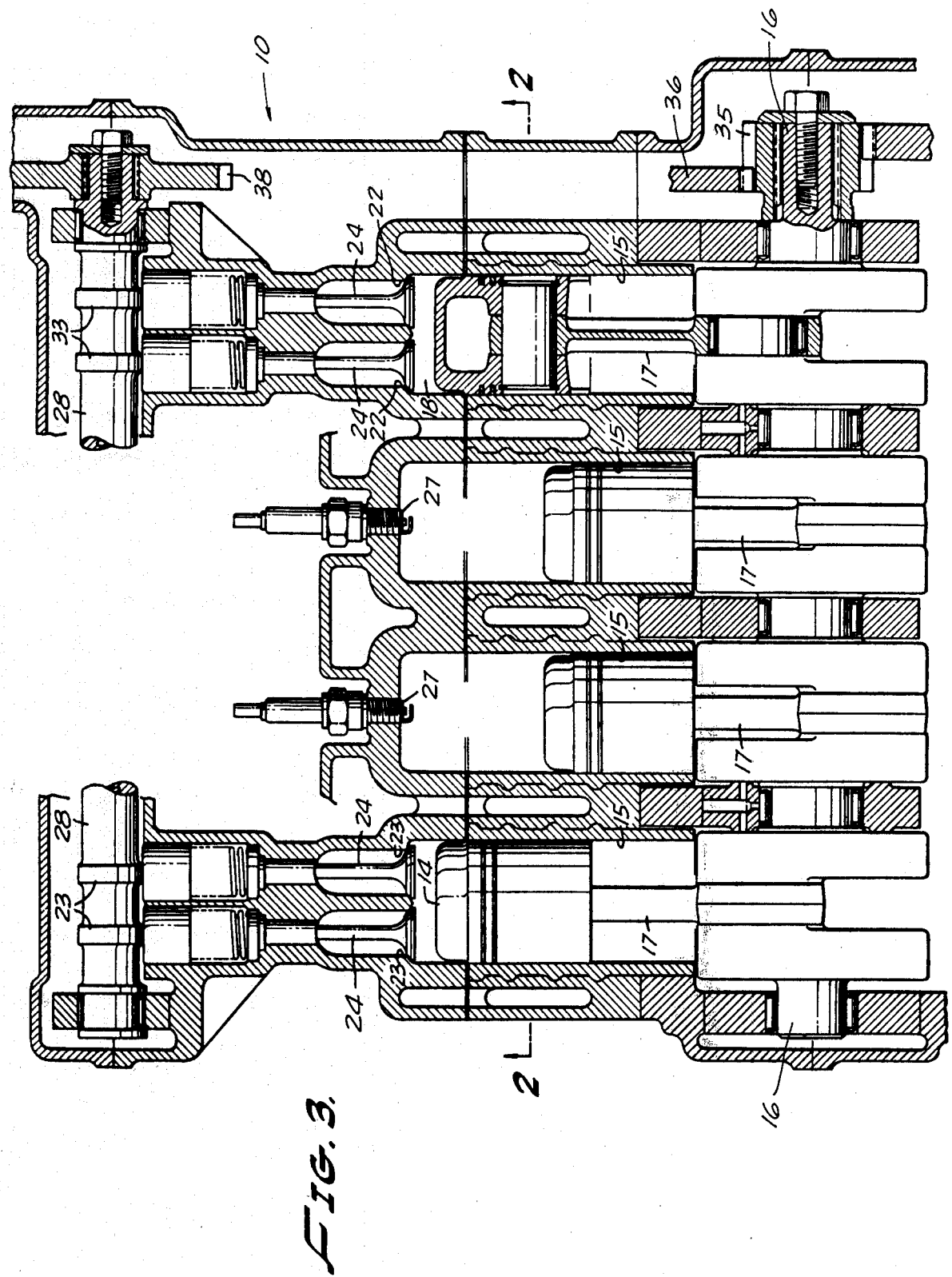
FIG. 3 is a sectional elevation taken substantially on the lines 3—3 as shown on FIG. 2.
Figure 9:
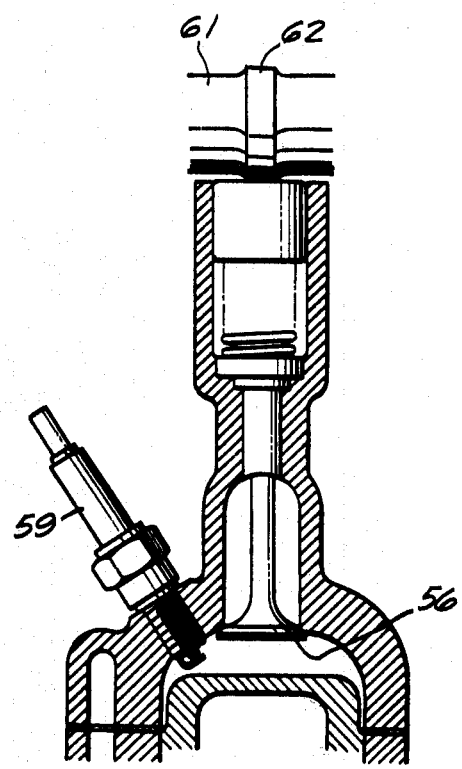
FIGS. 8 and 9 show a modification.
Figure 4:
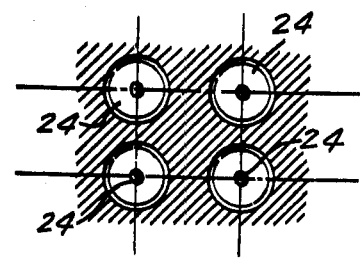
FIG. 4 is a fragmentary sectional view taken along the lines 4—4 as shown on FIG. 1.
Figure 5:
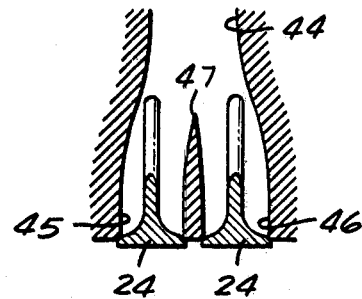
FIG. 5 is a fragmentary sectional view taken along the lines 5—5 as shown on FIG. 1.

Referring to the drawings, the four cycle internal combustion engine generally designated 10 is provided with a cylinder block 11, a crank case 12 and a cylinder head 13. An oblong piston 14 slides within each oblong cylinder bore 15, and each piston 14 is connected to the crank shaft 16 by means of a connecting rod 17. Each combustion chamber 18 is formed by walls 19 on the cylinder block 13 in cooperation with the upper domed surface of each piston 14. The combustion chambers 18 are oblong as is clearly shown in FIG. 2.

Figure 1:
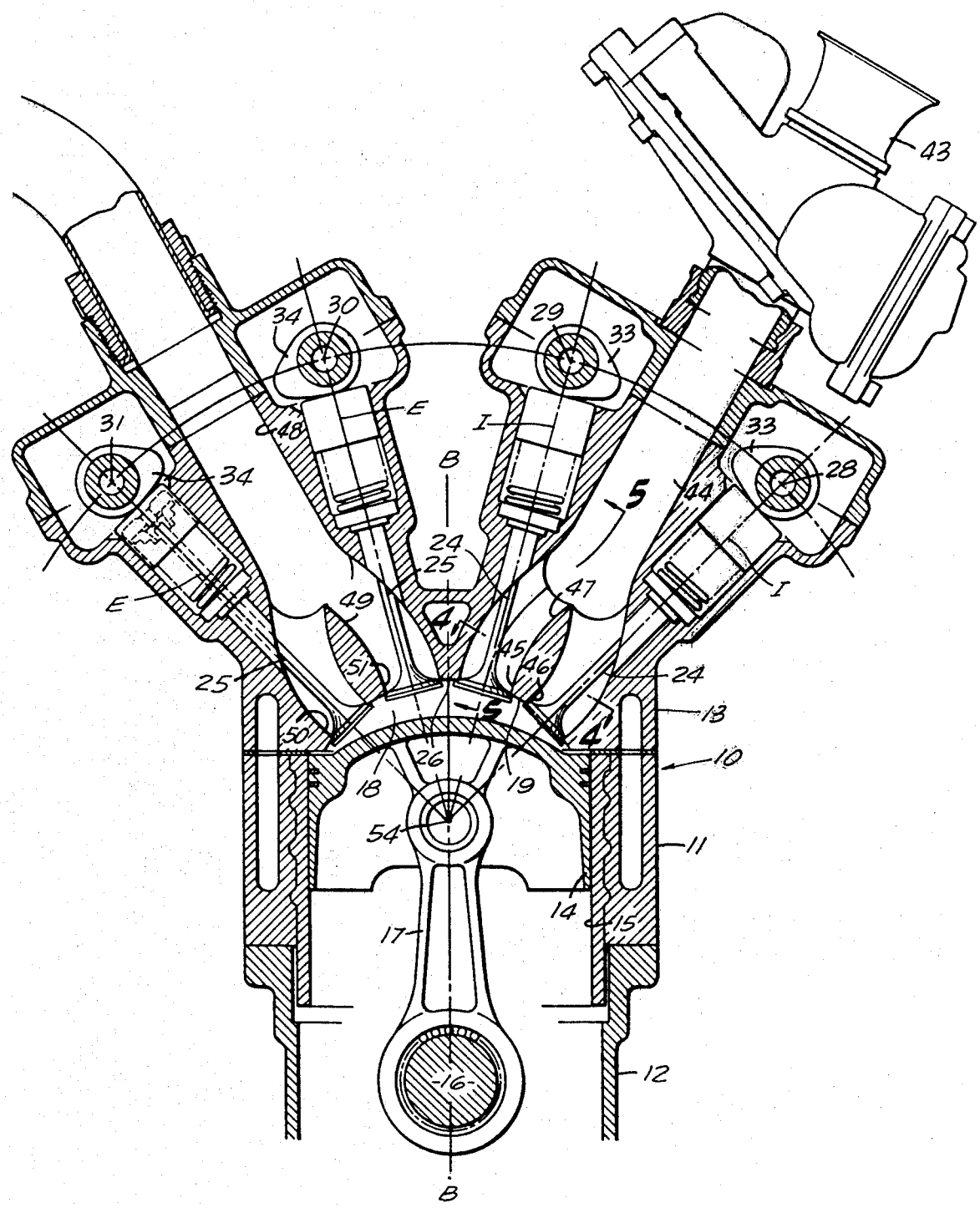
FIG. 1 is a transverse sectional elevation taken substantially on the lines 1—1 as shown on FIG. 2, and comprising a preferred embodiment of this invention.

A plurality of sets of intake ports 22 communicate with the oblong combustion chamber 18 on one side of the transverse axis B—B. Similarly, a plurality of sets of exhaust ports 23 communicate with the combustion chamber 18 on the other side of the transverse axis B—B. Poppet-type valves 24 and 25 close the intake ports 22 and exhaust ports 23, respectively. Each of the intake valves 24 and exhaust valves 25 has a longitudinal axis I and E, respectively, and as shown in FIG. 1 the angular spacing between two intake valves 24 and the angular spacing between two exhaust valves 25 is substantially the same. The heads of these valves cooperate with the walls 19 in forming the arched roof 26 of the combustion chamber 18.

A spark plug 27 is provided for each combustion chamber 18 and is positioned substantially on the transverse axis B—B. In the form of the invention shown in FIGS. 1-6, the spark plug 27 is positioned centrally of the combustion chamber 18 between the set of intake valves 24 and the set of exhaust valves 25.

Figure 6:
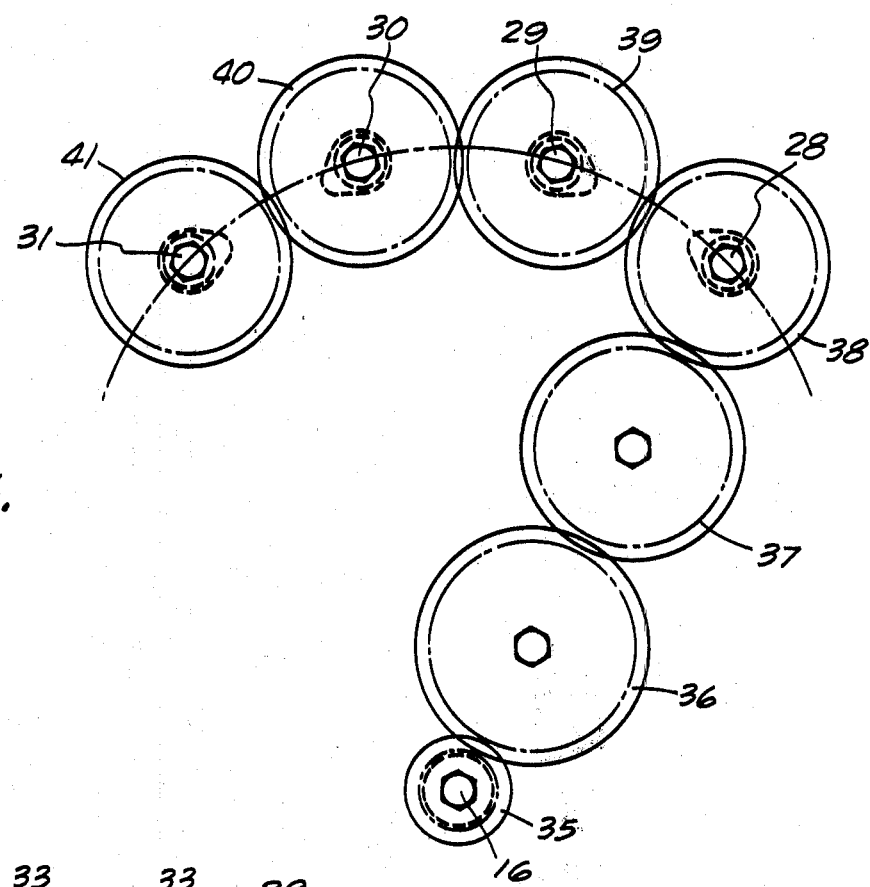
FIG. 6 is a front view showing the driving gear system of intake cam shaft and exhaust cam shaft.

Four separate cam shafts 28, 29, 30 and 31 are provided. Cam shafts 28 and 29 operate pairs of intake valves 24 through cam lobes 33 while cam shafts 30 and 31 operate pairs of exhaust valves 25 through cam lobes 34. As best shown in FIG. 6, the cam shaft 28 is driven through gears 35, 36, 37 and 38. Cam shafts 29, 30 and 31 are driven by gears 39, 40 and 41, respectively. With this arrangement cam shafts 28 and 30 rotate in one direction and cam shafts 29 and 31 rotate in the opposite direction.

The intake mixture for each combustion chamber is supplied by a carburetor 43 which delivers air-fuel mixture into the intake passage 44. Each passage 44 is divided into two passageways 45 and 46 by the divider wall 47. One poppet-type inlet valve 24 controls flow through each of the passageways 45 and 46, respectively (see FIG. 5). Similarly, the exhaust passage 48 is divided at its upstream end by the divider wall 49 which separates the exhaust passageway 50 from the exhaust passageway 51. One of the exhaust valves 25 closes each of the exhaust passageways 50 and 51.

Each of the intake passages 44 and each of the exhaust passages 48 extend radially along the long axis A—A of the combustion chamber 18. The cam shafts 28 and 29 are supported on each side of the intake passages 44 by the cylinder block 13 and the cam shafts 30 and 31 are supported on each side of the exhaust passage 48 by the cylinder block 13 so that the cam shafts 28, 29, 30 and 31 are parallel to the transverse axes B—B of the combustion chambers 18.

The inclined axes I of the intake valves 24 and the inclined axes E of the exhaust valves 25, as shown in FIG. 1, are all contained in the same plane 53 and all of the inclined axes intersect at a common point 54. The other valves in each pair also have inclined axes in another parallel plane 55 and their inclined axes also meet at a common point, not shown.

The angular spacing between the inclined axes I is substantially the same as the angular spacing between the inclined axes E.

In operation, all four intake valves 24 of each cylinder are open during the suction stroke and all four exhaust valves 25 of each cylinder are open during the exhaust stroke, thus promoting volumetric efficiency. When the spark plug 27 in each combuston chamber 18 is ignited at the end of the compression stroke, the combustion flame is propagated quickly in the longitudinal direction of the combustion chamber 18.

Figure 8:
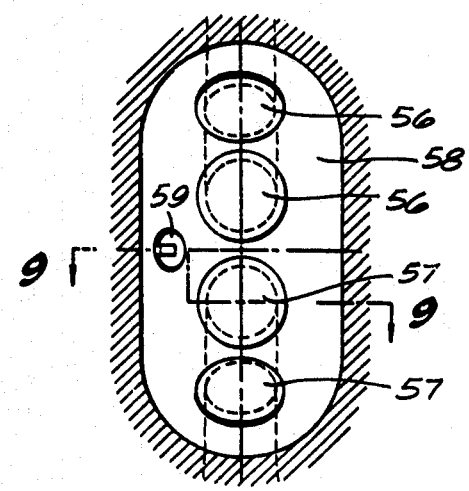
Figure 7:
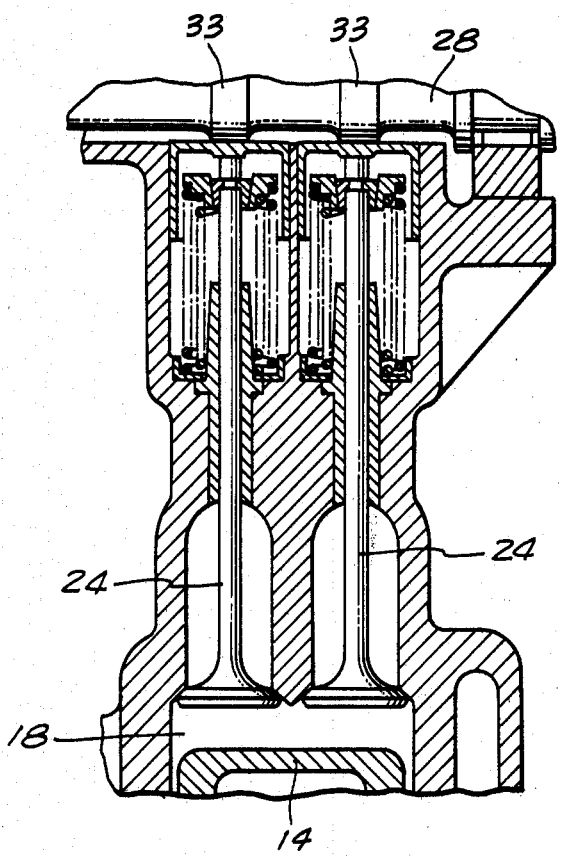
FIG. 7 is a sectional view showing a portion of FIG. 3 on a larger scale and in more detail.

In the modified form of the invention shown in FIGS. 7 and 8, only two intake valves 56 and two exhaust valves 57 are provided for each oblong combustion chamber 58. The spark plug 59 is mounted on the transverse axis of the oblong combustion chamber 58 but it is located to one side of the longitudinal axis of the combustion chamber 58 because of lack of space at the apex of the combustion chamber 58 adjacent valves 56 and 57. This form of the invention also requires four cam shafts 61 each with four cam lobes 62. The inclination of the axes of the valves 56 and 57 is similar to that described in connection with the first embodiment of this invention.

Having fully described my invention, it is to be understood that I am not to be limited to the details herein set forth but that my invention is of the full scope of the appended claims.

I claim:

1. In an internal combustion engine having a piston mounted to slide in a cylinder bore and connected to a crank shaft by a connecting rod, the improvement comprising, in combination: the piston and the cylinder bore being oblong in cross section having major dimensions at right angles to an axis of the crank shaft, walls cooperating with said piston and said cylinder bore to form an oblong combustion chamber having major and minor dimensions with an arched roof along the major dimension thereof, a set of poppet-type intake valves communicating with said combustion chamber and all on one side of a transverse plane through the minor dimension of said combustion chamber, a set of poppet-type exhaust valves communicating with said combustion chamber and all on the other side of said transverse plane, a spark plug communicating with said combustion chamber and positioned substantially on sid transverse plane, each of the intake and exhaust valves having a longitudinal axis inclined with respect to the cylinder bore axis, the axes of two intake valves and two exhaust valves lying in one plane along the major dimension of said combustion chamber and intersecting at a common point, the angular spacing between said two intake valves and said two exhaust valves being substantially the same, whereby the heads of the latter said four valves cooperate in forming the arched roof of said combustion chamber.

2. The combination set forth in claim 1 in which four intake valves are provided per set and four exhaust valves are provided per set.

3. The combination set forth in claim 1 in which two intake valves are provided per set and two exhaust valves are provided per set.

4. The combination set forth in claim 1 in which a single intake passage is provided for all of said intake valves and wherein a single exhaust passage is provided for all of said exhaust valves.

5. The combination set forth in claim 1 in which means including two cam shafts are provided for operating said intake valves and wherein means including two additional cam shafts are provided for operating said exhaust valves.

6. In an internal combustion engine having a piston mounted to slide in a cylinder bore and connected to a crank shaft by a connecting rod, the improvement comprising, in combination: the piston and the cylinder bore being oblong in cross section having major dimensions at right angles to an axis of the crank shaft, walls cooperating with said piston and said cylinder bore to form a combustion chamber having major and minor dimensions with an arched roof along the major dimension thereof, a set of four poppet-type intake valves communicating with the combustion chamber and all on one side of a transverse plane through the minor dimension of said combustion chamber, a set of fou popper-type exhaust valves communicating with said combustion chamber and all on the other side of said transverse plane, a spark plug communicating with said combustion chamber and positioned substantially on said transverse plane, each of the intake and exhaust valves having a longitudinal axis inclined with respect to the cylinder bore axis, the axes of two of the intake valves and two of the exhaust valves lying in a first plane and intersecting at a common point, the axes of the other two intake valves and the other two exhaust valves lying in a second plane parallel to the first plane and intersecting at a common point, the angular spacing of said two intake valves and said two exhaust valves in each plane being substantially the same, whereby the heads of all of said valves cooperate in forming the arched roof of said combustion chamber.

7. The combination set forth in claim 6 in which means including two cam shafts each operate two of said intake valves, and means including two additional cam shafts each operate two of said exhaust valves.

* * * * *